United States Patent [19]
Jurek et al.

[11] Patent Number: 5,497,260
[45] Date of Patent: Mar. 5, 1996

[54] METHOD OF APPLYING TIME OFFSET CHROMATIC DISPERSION, DISPERSIVE OPTICAL APPARATUS, AND AN OPTICAL FIBER TRANSMISSION SYSTEM USING THE APPARATUS

[75] Inventors: Marie-Paule Jurek, Noisy le Grand; Jean-Jacques Bernard, Vert le Grand; José Chesnoy, Paris, all of France

[73] Assignee: Alcatel N.V., Amsterdam, Netherlands

[21] Appl. No.: 260,735

[22] Filed: Jun. 15, 1994

[30] Foreign Application Priority Data

Jun. 17, 1993 [FR] France .................. 93 07316

[51] Int. Cl.$^6$ .................................. H04J 14/02
[52] U.S. Cl. .................. 359/130; 359/127; 359/123; 359/140
[58] Field of Search ................. 359/124, 127, 359/129, 130, 131, 634, 123, 140

[56] References Cited

U.S. PATENT DOCUMENTS

| | | | |
|---|---|---|---|
| 3,459,466 | 8/1969 | Giordmaine et al. | 350/160 |
| 3,863,063 | 1/1975 | Indig et al. | 250/199 |
| 4,777,663 | 10/1988 | Charlton | 359/127 |

FOREIGN PATENT DOCUMENTS

| | | |
|---|---|---|
| 0197263A2 | 10/1986 | European Pat. Off. . |
| 0593349 | 4/1994 | European Pat. Off. ............... 359/130 |
| 2535555A1 | 5/1984 | France . |
| WO9215903 | 9/1992 | WIPO . |

OTHER PUBLICATIONS

A. Frenkel et al, "Compensation of Negative Group Velocity Dispersion in Optical Fibers With a Grating and Telescope Pulse Compression", *Conference On Lasers Andn Electro–Optics, 1988 Technical Digest Series*, vol. 7, Apr. 25, 1988, pp. 130–133.

Primary Examiner—Leslie Pascal
Attorney, Agent, or Firm—Sughrue, Mion, Zinn, Macpeak & Seas

[57] ABSTRACT

Apparatus of the invention includes:
- a diffraction grating for angularly separating the spectrum components of a beam to be processed;
- a grating that is conjugate with the other grating, and that makes the components parallel again; and
- a stair-shaped mirror for reflecting the components back to the same gratings while imposing different path lengths on the respective components.

The invention is particularly applicable to compensating for the dispersion of a line fiber in a very long link between a transmitter and a receiver.

6 Claims, 1 Drawing Sheet

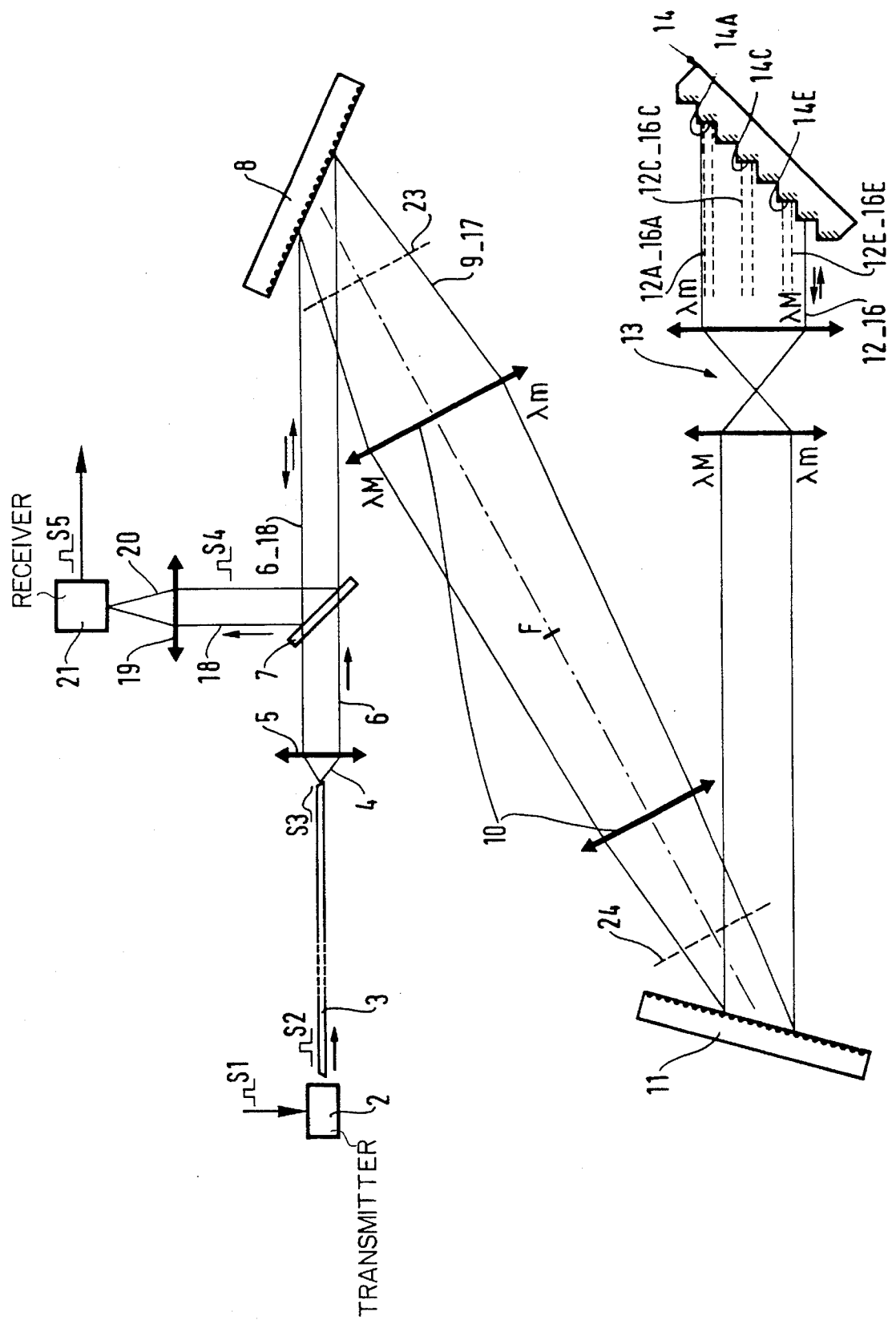

METHOD OF APPLYING TIME OFFSET CHROMATIC DISPERSION, DISPERSIVE OPTICAL APPARATUS, AND AN OPTICAL FIBER TRANSMISSION SYSTEM USING THE APPARATUS

The present invention relates to applying dispersion to optical signals. The dispersion to be applied is chromatic in that it must be applied as a function of the spectrum positions of the signals. The dispersion to be applied is also time dispersion in that it is achieved by applying time offsets between the signals.

BACKGROUND OF THE INVENTION

More precisely, the invention concerns applying desired time offsets between various unit signals that respectively modulate various spectrum components of a light beam to be processed. The invention is particularly applicable to the following typical case: initial overall modulation has been applied to an initial light beam so as to cause it carry information to be transmitted. That modulation has caused initial unit signals to appear which modulate the spectrum components of the beam. Finally, the unit signals have undergone various interference time offsets, such interference time offsets typically resulting from the interference chromatic dispersion that is specific to a medium through which the light of the initial beam propagated to constitute the beam to be processed. The present invention then aims to process the beam so as to apply desired chromatic dispersion thereto. The desired chromatic dispersion is chosen so as to compensate for the interference chromatic dispersion to the extent that is necessary to enable the information which was to be transmitted to be yielded from a processed beam.

In particular, the invention is advantageously applicable to following more specific case, which, in practice, is of considerable importance.

Prior to the present invention, a long transmission line (longer than 100 km) has been laid in the form of a line optical fiber equipped with intermediate optical amplifiers or repeaters for transmitting information at medium or high data rates. That prior fiber (already laid) typically has very high chromatic dispersion, in the vicinity of 20 ps/nm.km. Technical progress now makes it possible to transmit at very high data rates (10 Gbits/s) over a fiber with no intermediate optical amplifier or repeater. But the very high chromatic dispersion of the already-laid prior fiber prevents this possibility from being used if such very high data-rate transmission is to be achieved over that fiber.

The data rate being limited due to the high dispersion may be avoided by performing modulation outside the source, on transmission, thereby reducing spreading of the spectrum of the source, which spreading would otherwise result from the source being modulated directly by its injection current (chirp or interference frequency modulation due to intensity modulation).

However, the spectrum occupancy of the transmitted optical signal also results from the data-rate of the information to be transmitted. For links having very high data-rates (10 Gbits/s), the transmitted signal takes up a spectrum range corresponding to the modulation sidebands, i.e. about 0.2 nm. The chromatic dispersion results in total dispersion for the link of about 400 ps over 100 km, which is incompatible with the transmission data rate of 10 Gbits/s.

Apparatus for compensating the chromatic dispersion of the line fiber is therefore necessary if that prior fiber is to be used.

Such compensation may be performed, at the reception end, by a first known compensation apparatus constituted by an optical fiber that is much shorter than the line fiber but that has very high dispersion of the opposite sign. The optimum value of the compensation depends not only on the dispersion of the line fiber, but also on the non-linear effects that appear in that fiber. Said optimum value enables compensation to be performed effectively. But the space required by the compensation fiber is a drawback if the fiber is to be disposed in the form of a coil integrated in the receiver terminal.

A particular object of the present invention is to reduce the space required by dispersion compensation apparatus situated in the receiver terminal of a very long optical link.

A second known compensation apparatus includes firstly a color-splitting system for separating a plurality of spectrum components of the beam to be processed into physically distinct positions, and secondly a plurality of optical fibers of various lengths for respectively transmitting the components.

The second known apparatus is described in Document U.S. Pat. No. 3,863,063 (G. S. Indig et al).

Positioning the plurality of fibers of the second apparatus is difficult, and coupling losses appear at the inputs and outputs of the fibers.

A particular object of the present invention is to avoid using such a plurality of optical fibers.

In a third known dispersive optical apparatus, a first diffraction grating receives a parallel beam to be processed, and angularly separates the spectrum components of the beam. The angularly separated spectrum components are received by a second diffraction grating which is said to be "conjugate" with the first diffraction grating because it makes the components parallel again while conserving their respective separate positions. A mirror that is perpendicular to the beam then returns them to the second grating which returns them to the first grating which reconstitutes a processed parallel beam that propagates in the opposite direction from the beam to be processed, and that is separated therefrom by a sloping semi-reflective plate. The differences in path length of the various spectrum components achieve the desired chromatic dispersion.

In the third known apparatus, the set of two gratings constitutes both a color-splitting system, in the go direction, and also a color-recombining system, in the return direction. The desired time offsets are achieved inside that set.

Such known dispersive apparatus is described in the following article: TUP4 Compensation of negative group velocity dispersion in optical fibers with a grating and telescope pulse compressor. Anatoly Frenkel, Jonathan P. Heritage, Oscare. Martinez.—(CLEO '88/Tuesday Afternoon/130–133)—published by the Optical Society of America—2010 Massachusetts Avenue, NW, Washington D.C. 20036–1023.

That apparatus suffers from the drawback that the time offsets that can be applied are limited and insufficient for compensating the chromatic dispersion of a typical very long line fiber.

OBJECTS AND SUMMARY OF THE INVENTION

An object of the present invention is to increase the time offsets that are applied by dispersive optical apparatus.

More generally, an object of the present invention is to apply chosen large time offsets by means of apparatus that is cheap and compact.

To these ends, the present invention provides a method of applying time offset chromatic dispersion to a spectrally-composite light beam constituting a composite beam to be processed, the method including the following steps:

color-splitting said composite beam to be processed so as to separate a plurality of spectrum components of the beam into physically distinct positions;

then causing the components to reflect off a plurality of reflective areas constituting the steps of a stair-shaped mirror so as to constrain the components to travel along paths having a plurality of different respective optical path lengths; and finally recombining the colors by superposing the components so as to form a processed composite beam.

BRIEF DESCRIPTION OF THE DRAWING

An embodiment of the present invention is described below with reference to the accompanying drawing, in which the sole FIGURE shows an optical fiber transmission system of the invention, which system uses dispersive optical apparatus of the invention.

MORE DETAILED DESCRIPTION

In general, such apparatus includes the following elements:

a color-splitting system 8, 11 for receiving a light beam, the light beam constituting a composite beam to be processed 6; the light of the beam to be processed includes a plurality of spectrum components modulated by a plurality of unit signals respectively corresponding to the components; the components are superposed in the beam; the system responds by yielding an incoming split beam 12 which propagates in a longitudinal direction; the split beam is constituted by a plurality of incoming pencils 12A, 12C formed by the components and respectively corresponding to the components; the pencils are juxtaposed transversely in the beam, and the light of each of the pencils is modulated by the corresponding unit signal;

a time offset assembly 14 including a plurality of delay elements 14A, 14C respectively corresponding to the incoming pencils; one of the elements constitutes a reference element 14A; each delay element 14C is disposed so as to receive the corresponding incoming pencil 12C and so as to constrain the light of the pencil to travel along a path having an optical path length and a propagation time TC that correspond to the element so as to yield an outgoing pencil 16C corresponding to the incoming pencil and to the element; the light of the outgoing pencil is modulated by a unit signal having a delay equal to the propagation time relative to the unit signal which modulated the light of the incoming pencil; a time offset DC corresponding to the element, to the incoming pencil, and to the outgoing pencil is constituted by the difference TC–TA between that propagation time and the propagation time TA corresponding to the reference element; the set of outgoing pencils 16A, 16C constitutes an outgoing split beam 16 in which the pencils are juxtaposed transversely; and a color-recombining system 11, 8 for receiving the outgoing split beam and for yielding a processed composite beam 18 in which said components are superposed once more;

a mirror is disposed in known manner for receiving said incoming split beam 12 and for reflecting the light therefrom so as to constitute an outgoing split beam in which said pencils are still juxtaposed transversely.

In accordance with the present invention the mirror 14 is a stair-shaped mirror constituted by a plurality of reflective areas 14A, 14C respectively constituting said delay elements. Each reflective area 14C is disposed so as to reflect the incoming pencil 12C corresponding to the area by forming said outgoing pencil that also corresponds to the area. The reflective areas are offset from one another in the longitudinal direction so that the mirror constitutes said time offset assembly. Said reflective areas are plane and mutually parallel so that the mirror receives the incoming split beam 12 in the form of a parallel beam, and so that it yields said outgoing split beam 16 in the form of a parallel beam. Each of said reflective areas is perpendicular to the incoming pencil 12C corresponding to the area so as to make the path of said outgoing pencil 16C corresponding to the area coincide with the path of the incoming pencil. The color-splitting system 8, 11 then simultaneously constitutes the color-recombining system, as shown.

Each of the color-splitting and color-recombining systems includes the following elements:

a peripheral grating 8 constituted by a diffraction grating and capable of performing coupling between firstly a composite beam 6, 18 in the form of a parallel beam, and secondly an intermediate beam 9, 17 in which the propagation directions of said spectrum components are angularly distributed; areas crossed by the respective components substantially coincide with one another in sections 23 through the intermediate beam that are in the vicinity of the peripheral grating, and said areas are substantially separate in sections 24 through the intermediate grating that are situated at a distance that is not less than a separation distance from the peripheral grating; and a central grating 11 constituted by a diffraction grating and situated at a distance from said peripheral grating that is not less than said separation distance; the central grating is conjugate with the peripheral grating so as to perform coupling between firstly one of said intermediate beams 9, 17 and secondly one of said split beams 12, 16 in the form of a parallel beam; in this case, and as shown, said time offset assembly presents plane optical surfaces 14A, 14C to the beam.

Each of said spectrum components typically includes sub-components having various wavelengths in a spectrum range of the component, the spectrum ranges of the spectrum components being separate from one another and in succession within a spectrum range of the apparatus. In which case, the peripheral grating 8 and the central grating 11 of each of said color-splitting and color-recombining systems are preferably disposed so as to impose differences in path length on the various sub-components of each of said components, thereby causing additional time offsets that are limited such that a total time offset imposed on a sub-component by the apparatus varies continuously as a function of the wavelength of the sub-component within the limits of the spectrum range of the apparatus.

The present invention also provides an optical fiber transmission system including the following elements:

a transmitter 2 for supplying input optical signals S2 carrying data to be transmitted S1;

an optical fiber line 3 receiving the input optical signals and guiding them so as to yield intermediate optical signals S3 at a distance, which intermediate optical signals are affected by interference chromatic dispersion of the line;

dispersive optical apparatus as described above for receiving the intermediate optical signals and for imposing time offsets on said spectrum components and/or sub-components, which time offsets compensate for the interference chromatic dispersion so as to supply corrected optical signals S4; and a receiver 21 for receiving the corrected optical signals and for responding by yielding said data which was to be transmitted.

We claim:

1. Dispersive optical apparatus including:

a color-splitting system for receiving a light beam, the light beam constituting a composite beam to be processed and being constituted by light including a plurality of spectrum components modulated by a plurality of unit signals respectively corresponding to the components, the components being superposed in the beam, the system being capable of responding by yielding an incoming split beam propagating in a longitudinal direction of the beam, the split beam being constituted by a plurality of incoming pencils formed by the components and respectively corresponding to the components, the pencils being juxtaposed transversely in the beam, the light of each of the pencils being modulated by said corresponding unit signal;

a stair-shaped mirror having steps constituted by a plurality of reflective areas that are offset from one another in the longitudinal direction, and that respectively correspond to the incoming pencils, one of the areas constituting a reference area, each reflective area being disposed so as to receive and to reflect the corresponding incoming pencil while constraining the light of the pencil to travel along a path having an optical path length and a propagation time that correspond to the area so as to yield an outgoing pencil corresponding to the incoming pencil and to the area, the light of the outgoing pencil being modulated by a unit signal having a delay equal to the propagation time relative to the unit signal which modulated the light of the incoming pencil, a time offset corresponding to the area, to the incoming pencil, and to the outgoing pencil being constituted by the difference between that propagation time and the propagation time corresponding to the reference area, the set of outgoing pencils constituting an outgoing split beam in which the pencils are juxtaposed transversely; and a color-recombining system for receiving the outgoing split beam and for yielding a processed composite beam in which said components are superposed once more.

2. An optical fiber transmission system including:

a transmitter for supplying input optical signals carrying data to be transmitted;

an optical fiber line receiving the input optical signals and guiding them so as to yield intermediate optical signals at a distance, which intermediate optical signals are affected by interference chromatic dispersion of the line;

apparatus according to claim 1 for receiving the intermediate optical signals and for imposing time offsets on said spectrum components and/or sub-components, which time offsets compensate for said interference chromatic dispersion so as to supply corrected optical signals; and a receiver for receiving the corrected optical signals and for responding by yielding said data which was to be transmitted.

3. Apparatus according to claim 1, in which said reflective areas of the mirror are plane and mutually parallel so that the mirror receives said incoming split beam in the form of a parallel beam, and so that it yields said outgoing split beam in the form of a parallel beam.

4. Apparatus according to claim 1, in which each of said reflective areas of the mirror is perpendicular to said incoming pencil corresponding to the area so as to make the path of said outgoing pencil corresponding to the area coincide with the path of the incoming pencil, said color-splitting system simultaneously constituting said color-recombining system.

5. Apparatus according to claim 1, in which each of said color-splitting and color-recombining systems includes:

a peripheral grating constituted by a diffraction grating and capable of performing coupling between firstly one of said composite beams in the form of a parallel beam, and secondly an intermediate beam in which the propagation directions of said spectrum components are angularly distributed, areas crossed by the respective components substantially coinciding with one another in sections through the intermediate beam that are in the vicinity of the peripheral grating, and being substantially separate in sections through the intermediate grating that are situated at a distance that is not less than a separation distance from the peripheral grating; and a central grating constituted by a diffraction grating and situated at a distance from said peripheral grating that is not less than said separation distance, the central grating being conjugate with the peripheral grating so as to perform coupling between firstly one of said intermediate beams and secondly one of said split beams in the form of a parallel beam, said stair-shaped mirror presenting plane optical surfaces to the beam.

6. Apparatus according to claim 5, in which each of said spectrum components includes sub-components having various wavelengths in a spectrum range of the component, the spectrum ranges of the spectrum components being separate from one another and in succession within a spectrum range of the apparatus;

wherein said peripheral grating and said central grating of each of said color-splitting and color-recombining systems are disposed so as to impose differences in path length on the various sub-components of each of said components, thereby causing additional time offsets that are limited such that a total time offset imposed on a sub-component by the apparatus varies continuously as a function of the wavelength of the sub-component within the limits of the spectrum range of the apparatus.

* * * * *